(12) United States Patent
Gandhi et al.

(10) Patent No.: US 8,984,372 B2
(45) Date of Patent: Mar. 17, 2015

(54) TECHNIQUES FOR STORING ECC CHECKBITS IN A LEVEL TWO CACHE

(71) Applicant: NVIDIA Corporation, Santa Clara, CA (US)

(72) Inventors: Wishwesh Anil Gandhi, Sunnyvale, CA (US); Nirmal Raj Saxena, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 112 days.

(21) Appl. No.: 13/683,599

(22) Filed: Nov. 21, 2012

(65) Prior Publication Data

US 2014/0143635 A1    May 22, 2014

(51) Int. Cl.
*G11C 29/00* (2006.01)
*G06F 11/10* (2006.01)

(52) U.S. Cl.
CPC .................................... *G06F 11/10* (2013.01)
USPC .......................................... 714/764; 714/824

(58) Field of Classification Search
CPC .......................... G06F 11/2215; G06F 11/0802
USPC .................................................. 714/764, 824
See application file for complete search history.

(56) References Cited

U.S. PATENT DOCUMENTS

| 5,371,870 | A  | * | 12/1994 | Goodwin et al. | 710/52 |
| 5,452,418 | A  | * | 9/1995  | Tatosian et al. | 711/160 |
| 5,956,743 | A  | * | 9/1999  | Bruce et al. | 711/103 |
| 6,091,684 | A  | * | 7/2000  | Schell | 369/53.3 |
| 8,140,940 | B2 | * | 3/2012  | Doi | 714/764 |

\* cited by examiner

*Primary Examiner* — Fritz Alphonse
(74) *Attorney, Agent, or Firm* — Artegis Law Group, LLP

(57) ABSTRACT

A partition unit that includes a cache for storing both data and error-correcting code (ECC) checkbits associated with the data is disclosed. When a read command corresponding to particular data stored in a memory unit results in a cache miss, the partition unit transmits a read request to the memory unit to fetch the data and store the data in the cache. The partition unit checks the cache to determine if ECC checkbits associated with the data are stored in the cache and, if the ECC checkbits are not in the cache, the partition unit transmits a read request to the memory unit to fetch the ECC checkbits and store the ECC checkbits in the cache. The ECC checkbits and the data may then be compared to determine the reliability of the data using an error-correcting scheme such as SEC-DED (i.e., single error-correcting, double error-detecting).

20 Claims, 10 Drawing Sheets

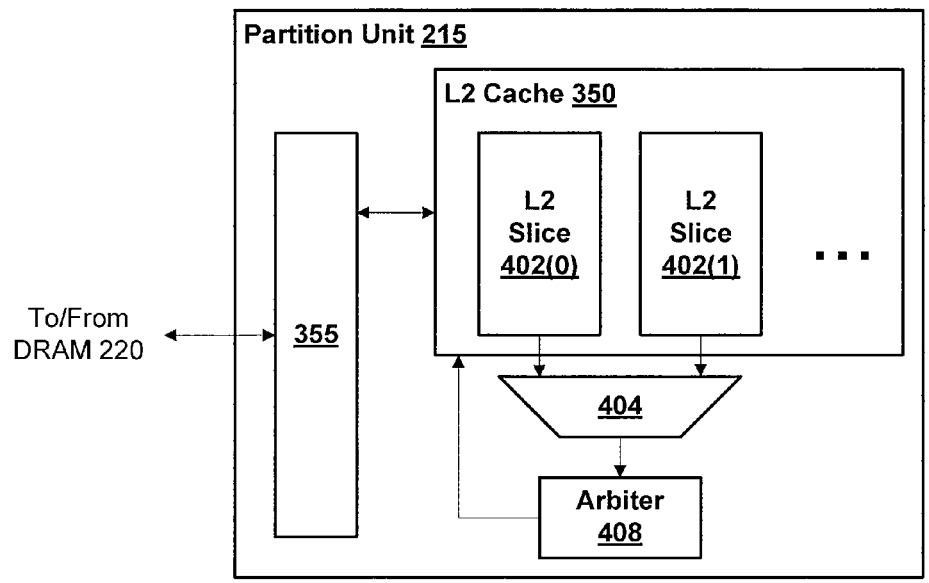
Figure 6A
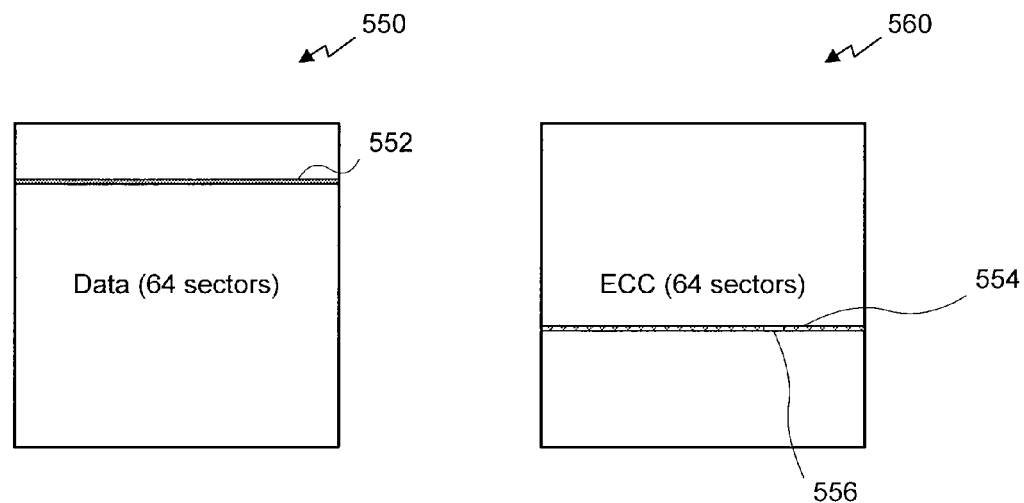
Figure 6B
Figure 6C

TECHNIQUES FOR STORING ECC CHECKBITS IN A LEVEL TWO CACHE

BACKGROUND OF THE INVENTION

1. Field of the Invention

The invention generally relates to a memory cache and, more specifically, to techniques for storing ECC checkbits in a level 2 (L2) cache.

2. Description of the Related Art

Electrical and magnetic interference inside a computer system can cause bits of dynamic random access memory (DRAM) to spontaneously change states. Research has shown that many of these errors are caused by background radiation that can spontaneously change the contents of a memory cell. To manage these types of state changes and other errors associated with stored data, memory systems oftentimes include error-correcting capabilities.

Error-correcting capabilities come in many flavors. Some memory systems store a redundant parity bit that represents the parity of a byte or word (e.g., 32 bits) of data. The parity bit indicates whether the data includes an even or odd number of high-level bits, which can be checked against the data to indicate if a single bit error has occurred. Other memory systems include error-correcting code (ECC) memory that stores a parity bit and an error-correcting code, such as a single error-correcting, double error-detecting (SEC-DED) Hamming code. A SEC-DED Hamming code can correct a single bit error and detect (but not correct) a double bit error. Another type of ECC memory uses triple modular redundancy (TMR) hardware where three redundant systems store data, and the three systems implement a voting mechanism to protect against single event upsets of one copy of the data.

Error-correcting capabilities can be implemented on the memory chip (i.e., DIMM or dual inline memory module) or in the memory controller that interfaces with the memory chip. In the case where the error-correcting capabilities are implemented in the memory controller, the memory bandwidth may be burdened by repeated requests to read the ECC checkbits from the memory unit. For example, in one conventional implementation, 256 bits of data stored in the memory unit is associated with 16 bits of ECC checkbits. In such an implementation, for each request to read 256 bits of data, a separate request to read 16 bits of ECC checkbits is also required. Typically, the ECC checkbits are also read in widths equal to the memory bandwidth (e.g., 256 bits). Thus, for each request to read ECC checkbits associated with a particular row of data, the memory controller receives a plurality of ECC checkbits associated with other rows of data. Consequently, as many different rows of data are fetched from the memory unit, the same row of ECC checkbits may be fetched repeatedly, using a potentially significant portion of the available memory bandwidth.

Accordingly, what is needed in the art is a more effective approach for storing the ECC checkbits at the memory controller in order to reduce redundant read requests transmitted over the memory interface.

SUMMARY OF THE INVENTION

One embodiment of the present invention sets forth a method for checking the reliability of data in a cache. The method includes the steps of receiving a read command associated with data stored at a physical address in a memory unit coupled to the cache and, determining that the data associated with the read command is not stored in the cache, then obtaining the data from the memory unit and storing the data in the cache. The method further includes the steps of querying the cache to determine whether a plurality of ECC checkbits associated with the data are stored in the cache and, if the cache indicates a cache hit, then comparing the plurality of ECC checkbits to the data to check the reliability of the data, or, if the cache indicates a cache miss, then obtaining the plurality of ECC checkbits from the memory unit and comparing the plurality of ECC checkbits to the data to check the reliability of the data.

Another embodiment of the present invention sets forth a system including a memory unit and a partition unit configured to check the reliability of data in a cache according to the method set forth above. Yet another embodiment of the present invention sets forth a computing device comprising a partition unit configured to check the reliability of data in a cache according to the method set forth above.

One advantage of the disclosed system is that error-correcting codes are cached locally and may be used for multiple sectors of data associated with the same sector of error-correcting codes stored in memory. Consequently, the described embodiments reduce the number of read requests transmitted to the memory unit, thereby enabling more of the available memory bandwidth to be used for data rather than error-correcting codes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A illustrates a partition unit of FIG. 2, according to one embodiment of the present invention;

FIGS. 6B and 6C illustrate a new technique for storing error-correcting codes (ECC) in memory, according to one embodiment of the present invention.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the present disclosure. However, it will be apparent to one of skill in the art that the invention may be practiced without one or more of these specific details.

System Overview

Figure 1:
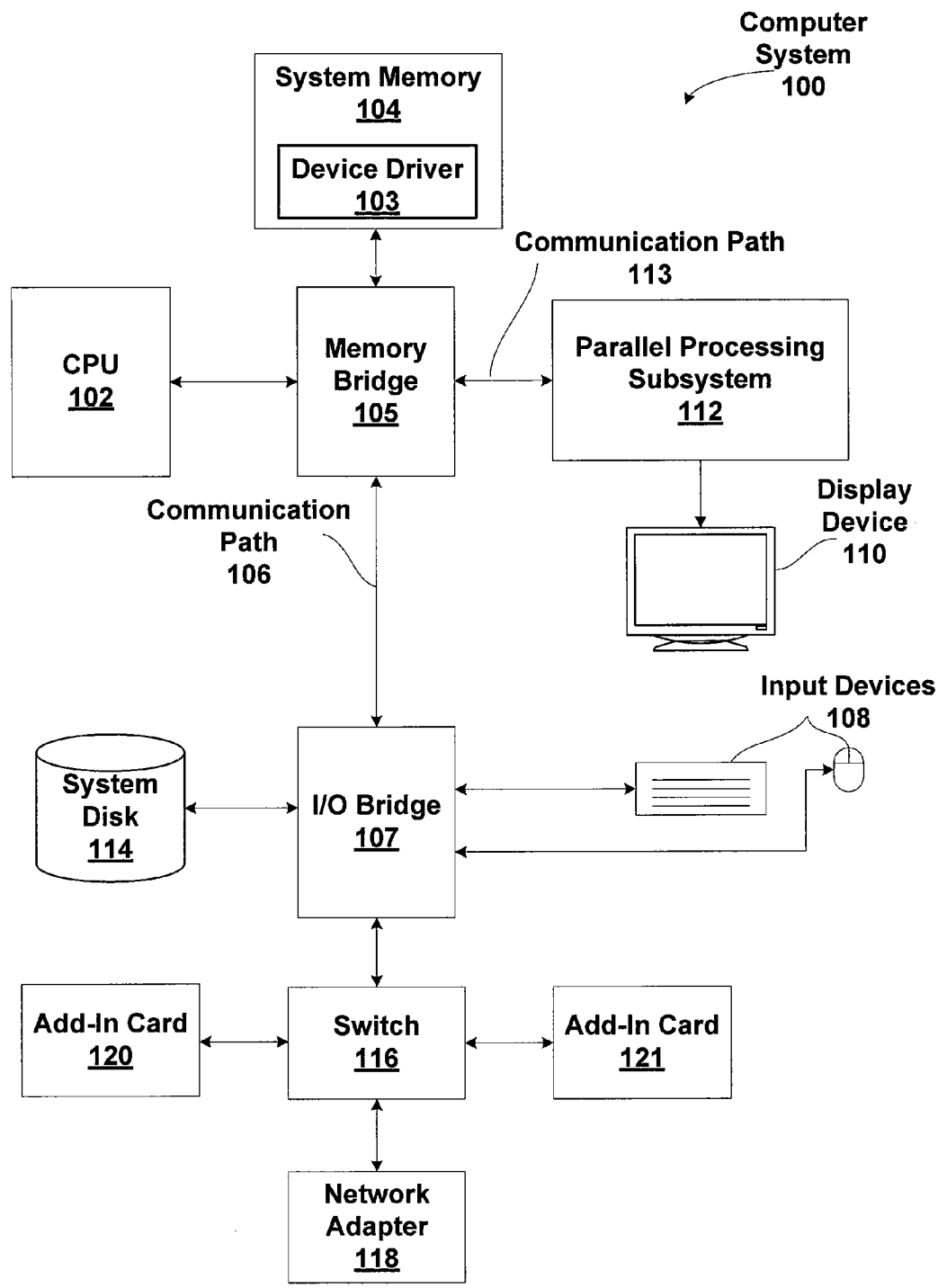
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
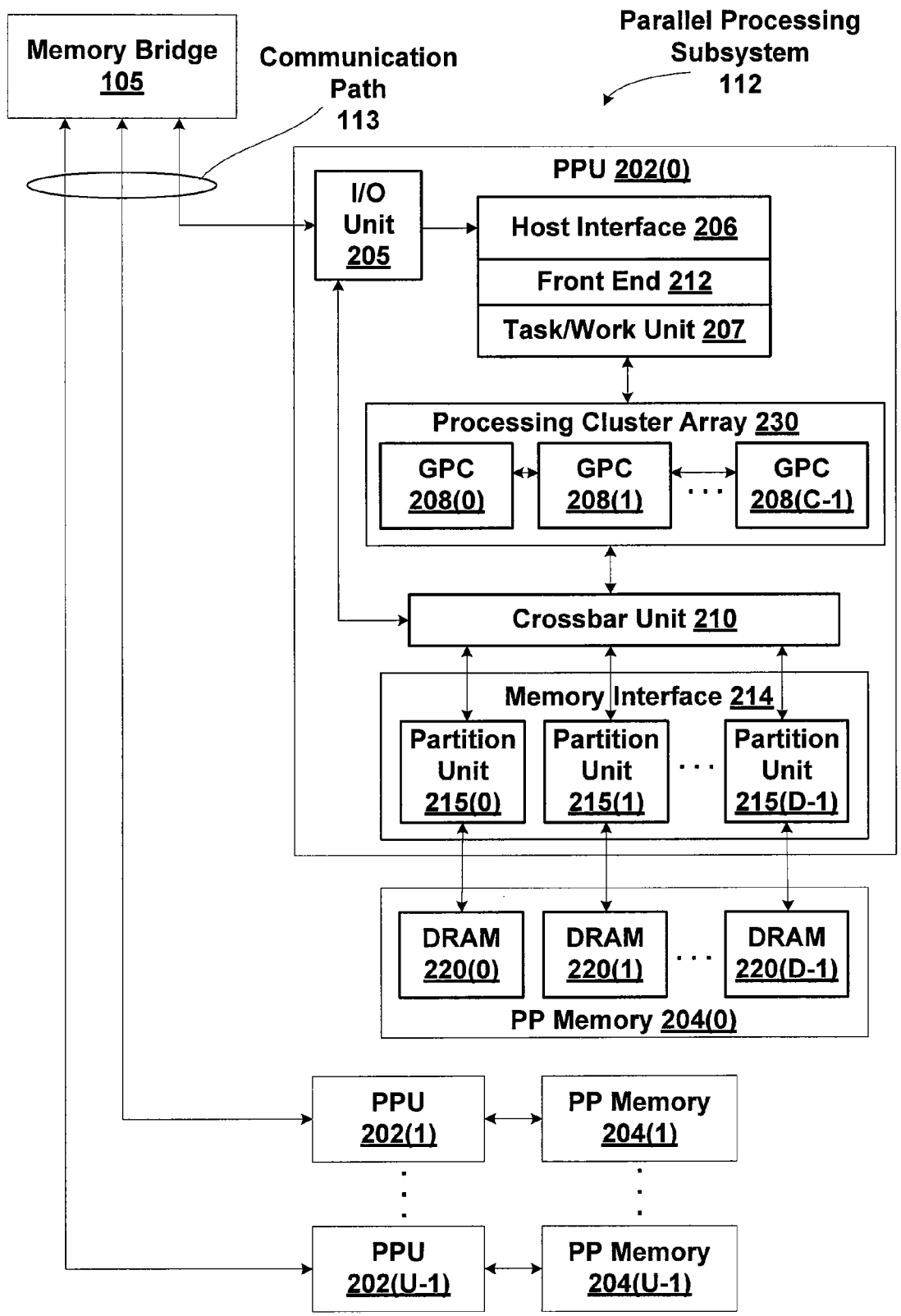
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
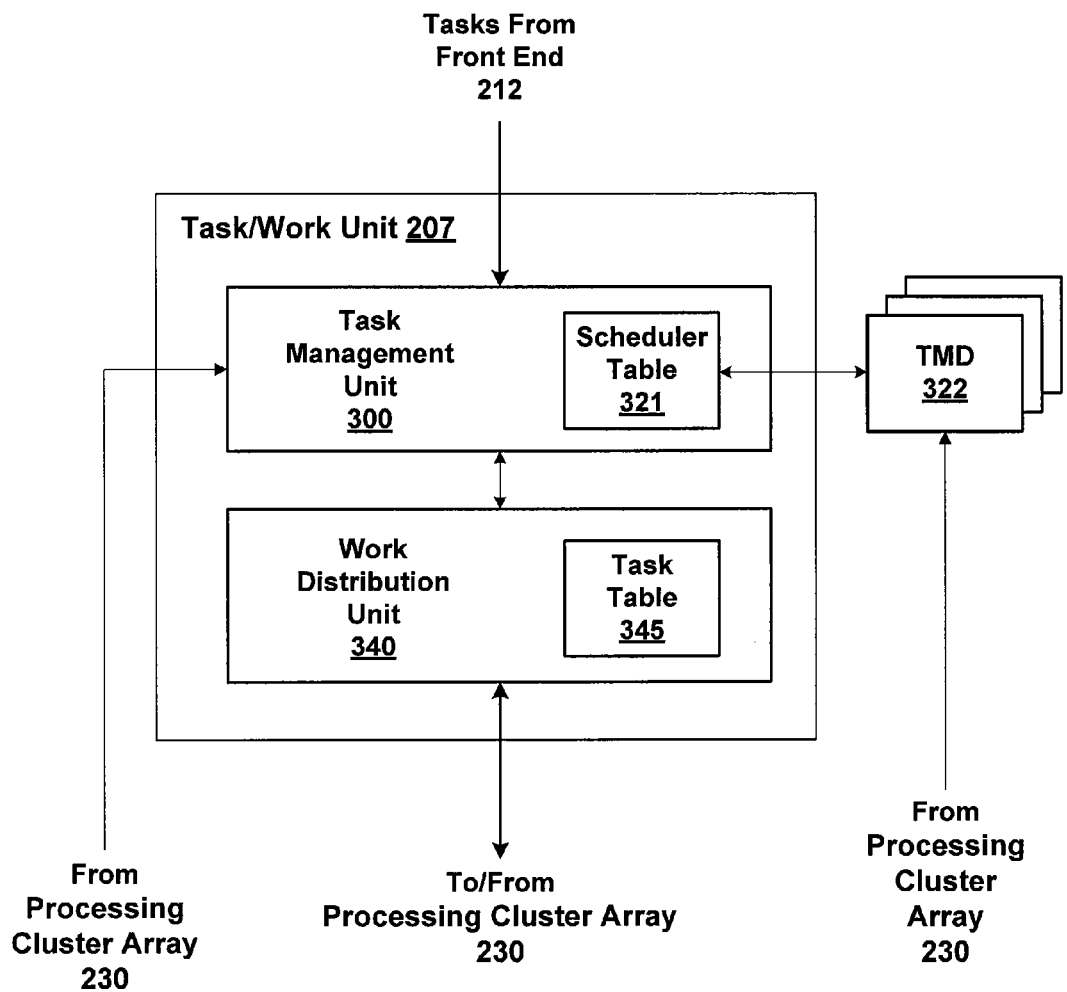
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
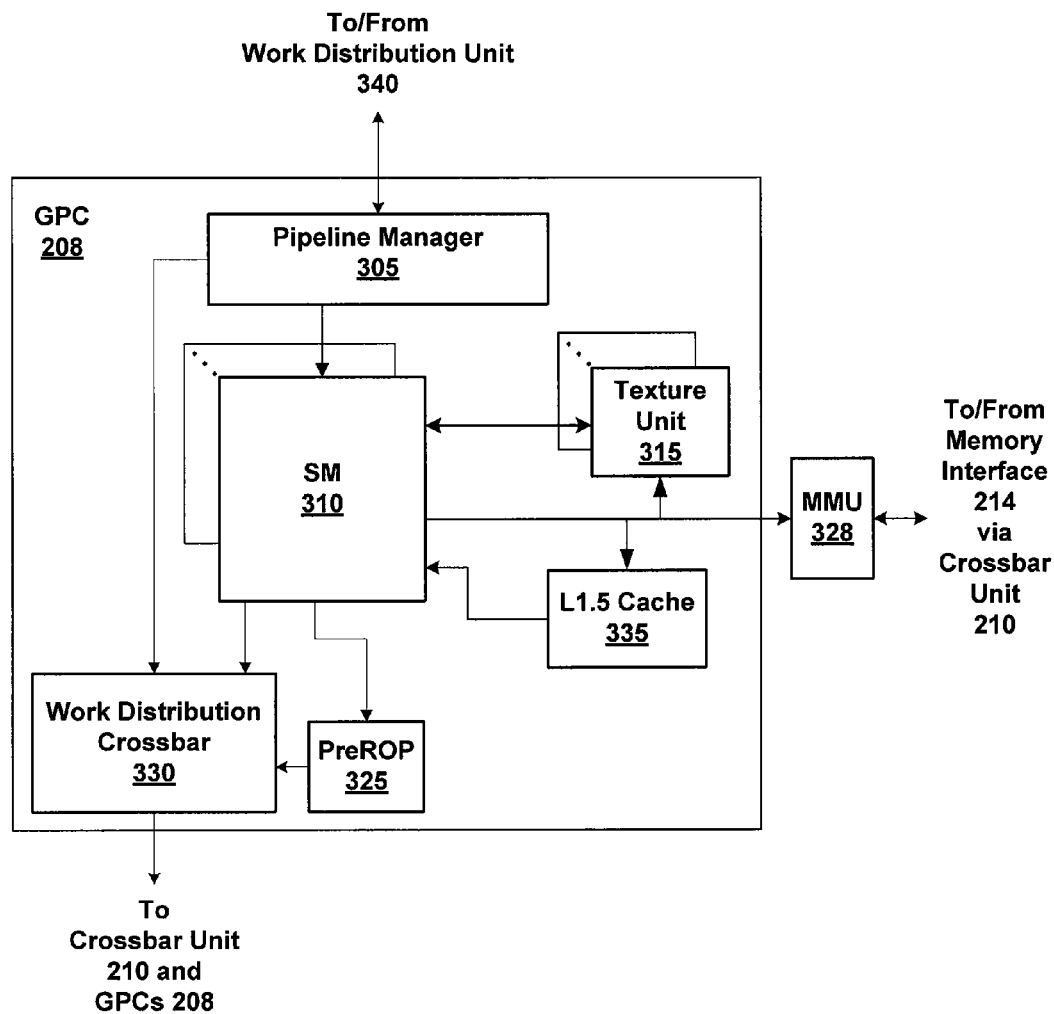
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
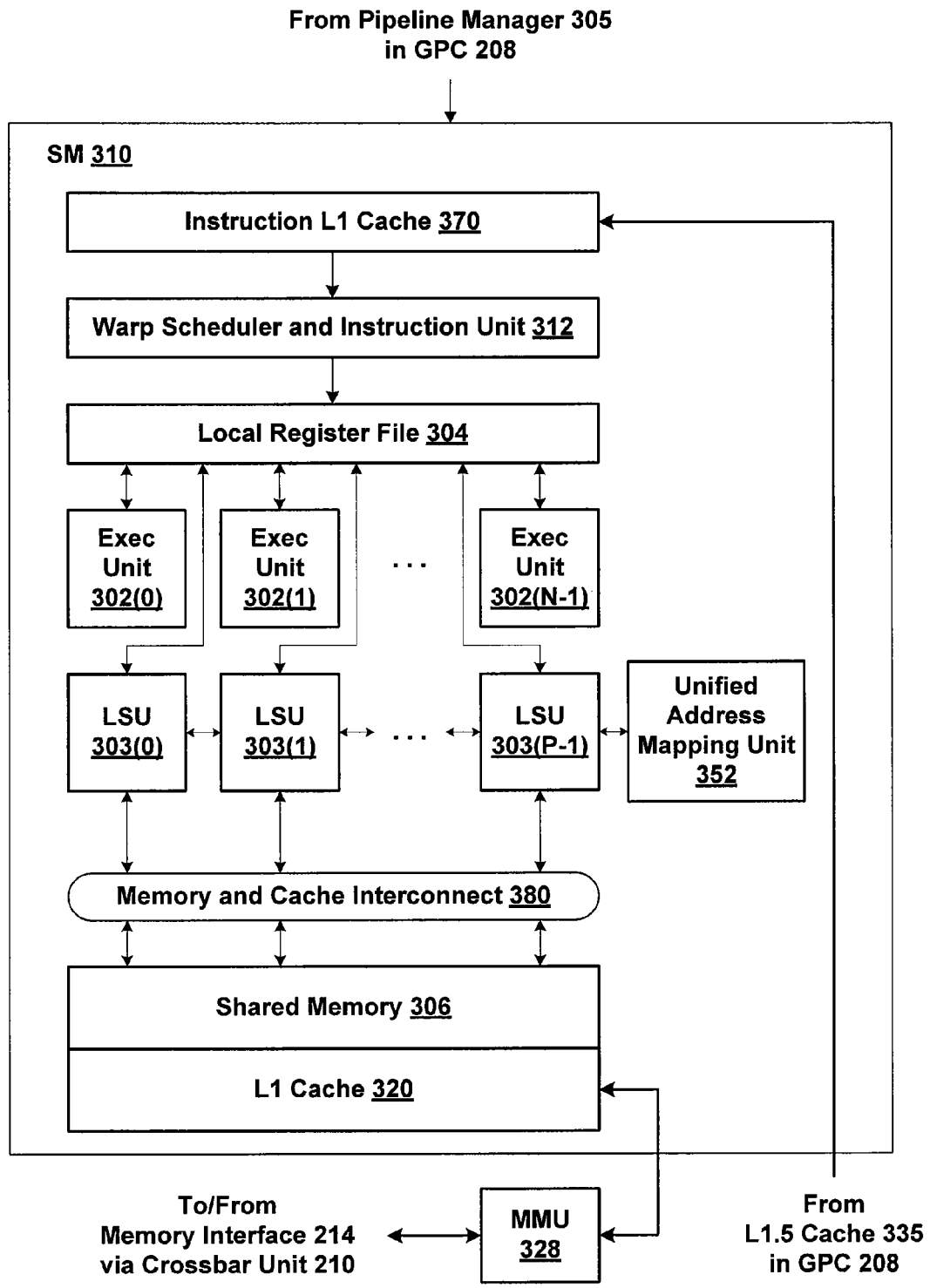
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each entry in a linked list stores a task pointer to a TMD 322 in memory and a pointer to the next entry in the respective linked list. A head pointer and a tail pointer for the linked list are stored for each TMD group. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD 322 corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more push buffers output by the host interface 206 at a faster rate than the compute tasks may be output for execution by the work distribution unit 340. The input from the different push buffers are independent streams, typically generated by the same application program in order to have multiple sets of dependent tasks, but in some embodiments, multiple application programs can write to the pushbuffers. The task management unit 300 may be configured to buffer the compute tasks in the scheduler table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the TMD group in which the selected compute task is stored. Regardless of the scheduling technique, the task management unit 300 is able to quickly select a compute task by selecting the first entry in the linked list of the appropriate group. The task management unit 300 may easily organize, and, if needed, reorder the compute tasks by simply changing the ordering of the task pointers in the linked lists of the TMD groups. Therefore, the compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority TMD group that has at least one compute task, starting at the head of the group.

Techniques for Storing Error-Correcting Codes in a Level Two (L2) Cache

Figure 4:
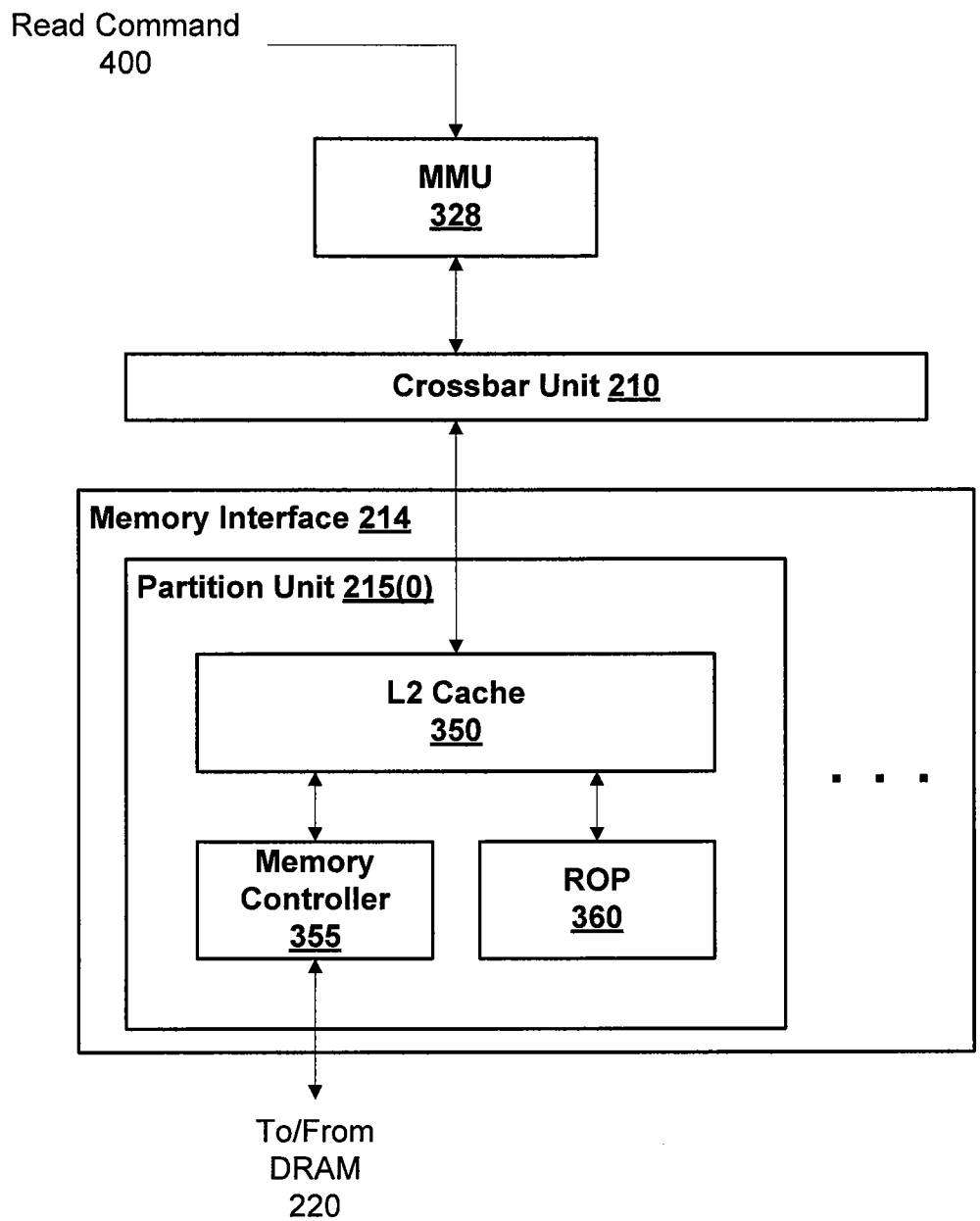
FIG. 4 is a block diagram of a partition unit of FIG. 2, according to one embodiment of the present invention.

FIG. 4 is a block diagram of a partition unit 215(0) of FIG. 2, according to one embodiment of the present invention. As shown, partition unit 215(0) includes a level-two (L2) cache 350 and a memory controller 355. In one embodiment, L2 cache 350 is a read/write cache that is configured to perform load and store operations received from crossbar unit 210 and ROP 360. Read requests and write requests are output by L2 cache 350 to the memory controller 355 for processing. Dirty updates are also sent to memory controller 355 for opportunistic processing. Memory controller 355 interfaces directly with parallel processing memory 204, outputting read and write requests and receiving data read from parallel processing memory 204 (i.e., DRAM 220). In one embodiment, L2 cache 350 is an N-way set associative cache. As an N-way set associative cache, the L2 cache 350 includes a data store for storing one or more sets of cache lines and a tag store that includes tags that indicates the memory addresses associated with the cache lines stored in the data store.

In one embodiment, partition unit 215(0) includes a raster operations unit (ROP) 360. In graphics applications, ROP 360 is a processing unit that performs raster operations, such as stencil, z test, blending, and the like, and outputs pixel data as processed graphics data for storage in graphics memory (e.g., PP memory 204). The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory. In another embodiment, ROP 360 is included within each GPC 208 instead of partition unit 215, and pixel read and write requests are transmitted to L2 cache 350 over crossbar unit 210 instead of pixel fragment data.

As shown in FIG. 4, a read command 400 generated by GPC 208 is transmitted to MMU 328, which, when PPU 202 implements a virtual memory architecture, translates virtual addresses to a physical address in parallel processing memory 204. The read command 400 specifies an address of data to be fetched by memory interface 214. Once the MMU 328 has translated the virtual address associated with the read command 400 into a physical address in DRAM 220(0), the MMU 328 configures the crossbar unit 210 to transmit a modified read command 400 including the physical address to the memory interface 214. The L2 cache 350 receives the read command 400 and determines whether a copy of the data stored in the physical address associated with the modified read command 400 is temporarily stored in the L2 cache 350. A cache hit indicates that a copy of the data exists in the L2 cache 350, and the L2 cache 350 transmits the data to the GPC 208. However, a cache miss indicates that a copy of the data does not exist in the L2 cache and the data must first be fetched from DRAM 220(0).

Figure 5A:
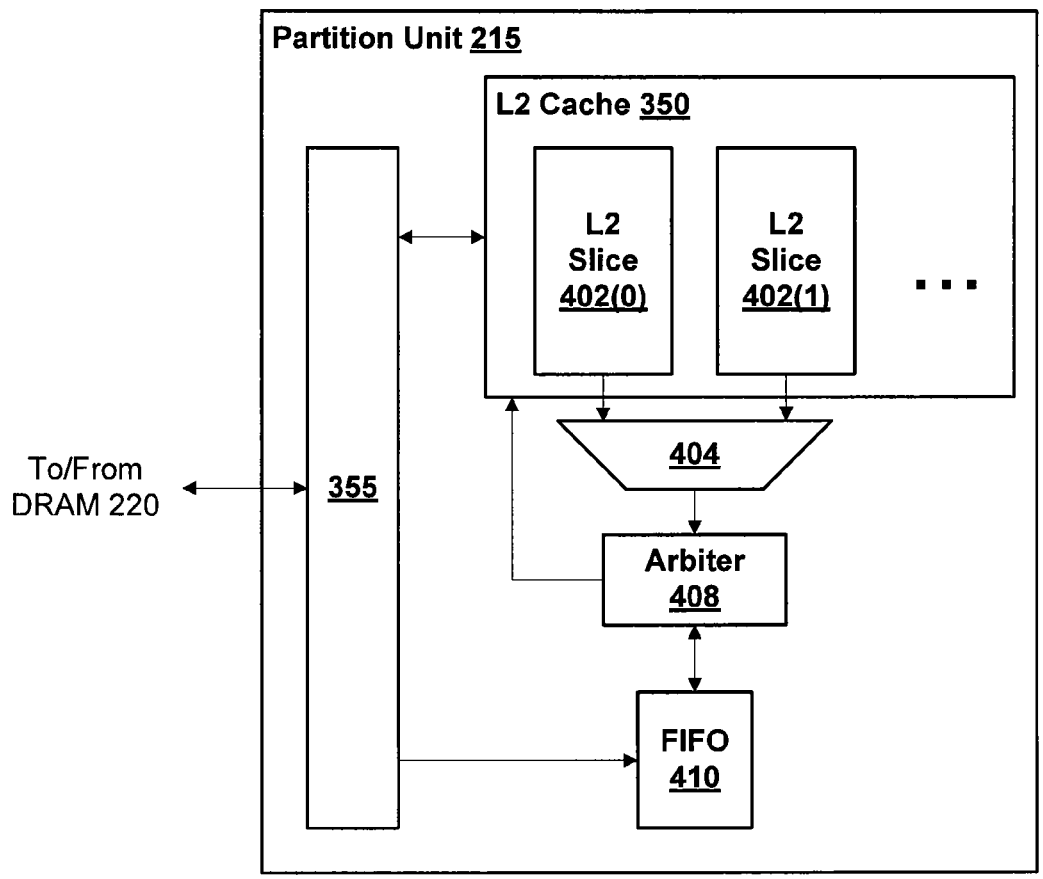
FIG. 5A illustrates a conventional partition unit, according to the prior art.

FIG. 5A illustrates a conventional partition unit 215, according to the prior art. As shown in FIG. 5A, partition unit 215 includes an L2 cache 350 divided into one or more L2 cache slices 402. The partition unit 215 also includes a memory controller 355, a multiplexor 404, an arbiter 408, and a FIFO 410. The L2 cache 350 may be split into two or more L2 cache slices 402 for more efficient processing of read/write commands; e.g., by assigning read/write commands from different processes (i.e., applications) to different cache slices 402 ensuring that one high bandwidth process does not evict data used by a different process. Each L2 cache slice 402 may store up to a threshold number of cache lines from PP memory 204. As shown, L2 cache slice 402(0) is one slice of the L2 cache 350.

In operation, L2 cache slices 402 receive read and write commands from various clients of PPU 202, such as GPCs 208 or ROP unit 360. The read and write commands include an address in memory where the corresponding data is located. As shown in FIG. 4, MMU 328 may translate a virtual address associated with the read and write commands and configure crossbar 210 to communicate with one of the partition units 215. The particular partition unit 215 is selected based on the physical address associated with the read and write commands. The L2 cache 350 receives the read or write commands including the translated physical address and determines whether the data associated with the read or write command is stored locally in one of the L2 cache slices 402.

When L2 cache 350 receives a read command, the L2 cache 350 determines if there has been a cache hit by checking the particular cache slice 402 corresponding to the address associated with the read command. If the address included in the read command causes a cache hit (i.e., the data is stored in one of the L2 cache slices 402), then the data may be read from the L2 cache 350 and transmitted to the originator of the read command (e.g., GPC 208). However, if the address included in the read command causes a cache miss (i.e., the data is not stored in one of the L2 cache slices 402), then the partition unit 215 fetches the data from DRAM 220 and stores the data in one of the L2 cache slices 402, evicting data in the L2 cache slice 402 if necessary.

Figure 5B:
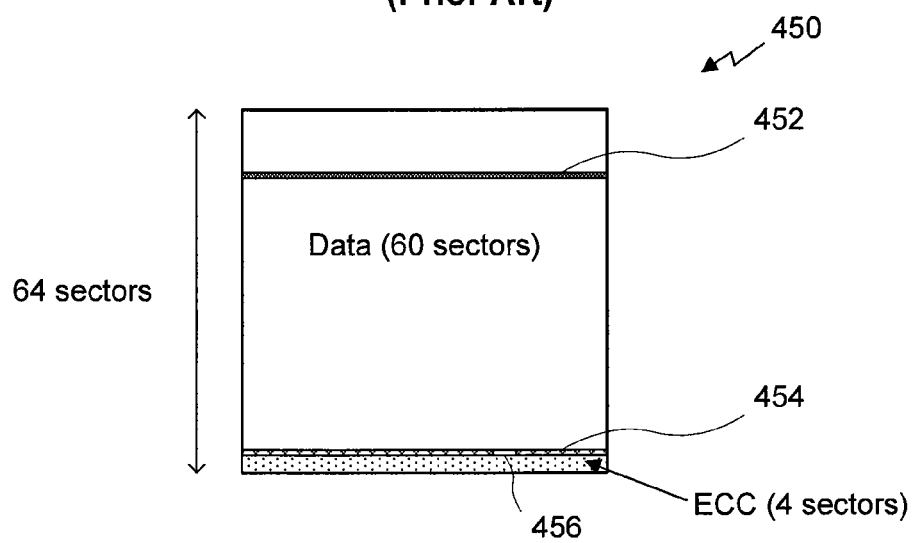
FIG. 5B illustrates a conventional technique for storing error-correcting codes (ECC) in memory, according to the prior art.

FIG. 5B illustrates a conventional technique for storing error-correcting codes (ECC) in memory, according to the prior art. As shown in FIG. 5B, a virtual memory page 450 may include a number of sectors for storing data and/or ECC checkbits. For example, a two kilobyte (2 KB) memory page may include 64 sectors, each sector including 32 bytes (32 B) of data. The ECC checkbits are stored in particular sectors of the virtual memory page 450. In one implementation, ECC utilizes single error-correction, double error-detection (SEC-DED) Hamming codes, such that each 32 byte sector corresponds to two bytes of corresponding ECC checkbits. Thus, for each 16 sectors of data (e.g., data 452) in a virtual memory page, one sector of ECC checkbits (e.g., ECC checkbits 454) is stored at the end of the virtual memory page. As shown in FIG. 5B, the twelfth sector 452 (i.e., 32 B) of virtual memory page 450 corresponds to two bytes of ECC checkbits 456 in the $61^{st}$ sector 454 of the virtual memory page 450.

Returning now to FIG. 5A, when a sector of data is written from DRAM 220 into L2 cache 350, partition unit 215 also reads a corresponding sector of ECC checkbits into FIFO 410. Typically, a cache line is sized according to the memory bandwidth. For example, in GDDR5 (graphics double data rate, version 5) SDRAM (synchronous dynamic random access memory), each read request fetches 256 bits (i.e., 32 bytes) of data using an 8n prefetch buffer. Thus, a cache line in L2 cache 350 could be 256 bits to correspond to the memory bandwidth for GDDR5 SDRAM. It will be appreciated that the width of a cache line may be other sizes as well (e.g., 128 bits, 512 bits, etc.). Because the ECC checkbits are stored in a different portion of the virtual memory page, the ECC checkbits for a sector of data are fetched according to a different read request than the data. Therefore, first the data is written into the L2 cache 350 and then the ECC checkbits are written to the FIFO 410. Once the data and ECC checkbits are stored in the partition unit 215, arbiter 408 checks to determine whether there are any errors in the data. For example, SEC-DED Hamming codes may be used to correct a single bit error and detect a two bit error. If the error can be corrected, then arbiter 408 may correct the data in the L2 cache 350 or may discard the data and signal an error condition. Once the data has been checked, the ECC checkbits are discarded.

It will be appreciated that read requests transmitted to the DRAM 220 fetch one sector of data or ECC checkbits at a time. So, while 256-bits of data are fetched by a first read request, 256-bits of ECC checkbits are also fetched by a second read request. In other words, a plurality of ECC checkbits are fetched and then discarded because some of the ECC checkbits correspond to other sectors of the virtual memory page 450. In this case, fetching a plurality of sectors of data in the virtual memory page 450 may require multiple redundant fetches of the same sector of ECC checkbits, which is inefficient and eats up the available memory bandwidth.

FIG. 6A illustrates a detailed view of the partition unit 215 of FIG. 4, according to one embodiment of the present invention. ROP unit 360 is not shown explicitly in FIG. 6A, and, in some embodiments, ROP unit 360 may be included in the GPC 208 rather than the partition units 215. As shown in FIG. 6A, partition unit 215 includes an L2 cache 350, a memory controller 355, a multiplexor 404, and an arbiter 408. The L2 cache 350 may be divided into one or more L2 cache slices 402. Importantly, the partition unit 215 of FIG. 6A does not include the FIFO 410 for storing ECC checkbits. Instead, partition unit 215 is configured to store ECC checkbits in the L2 cache 350 and arbiter 408 is configured to read both the data and the ECC checkbits from the L2 cache 350. Consequently, when multiple data sectors corresponding to the same sector of ECC checkbits are written into the L2 cache 350, the partition unit 215 does not need to fetch the ECC checkbits from the DRAM 220 because the address corresponding to the ECC checkbits causes a cache hit in the L2 cache 350.

FIGS. 6B and 6C illustrate a new technique for storing error-correcting codes (ECC) in memory, according to one embodiment of the present invention. As shown in FIG. 6B, data is stored in a first virtual memory page 550. For example, a first sector 552 of the first virtual memory page 550 stores 32 bytes of data. Instead of storing the ECC checkbits associated with the first sector 552 in a different sector of the first virtual memory page 550, a second sector 554 of ECC checkbits 556 are stored in a second virtual memory page 560, as shown in FIG. 6C. In one embodiment, the first virtual memory page 550 and the second virtual memory page 560 are similarly sized (e.g., 2 KB) such that the second virtual memory page 560 can store ECC checkbits corresponding to 16 virtual memory pages of data.

When compared to the conventional technique of FIG. 5B (i.e., where the ECC checkbits are stored in the same virtual memory page as the corresponding data), the ECC checkbits are packed more efficiently. For example, virtual memory page 450 of FIG. 5B includes 60 sectors of data corresponding to 120 bytes of ECC checkbits. However, the ECC checkbits are stored in four sectors of the virtual memory page 450 having a total capacity of 128 bytes. Thus, 8 bytes of the virtual memory page 450 are unused. Furthermore, in some embodiments, efficient error-correcting codes may be implemented with as little as 10 or 12 bits (i.e., less than 2 bytes) per 32 bytes of data. Thus, implementing a more efficient packing scheme, one sector of ECC checkbits (i.e., 256 bits) could correspond to more than the 16 sectors of data when ECC checkbits for a particular sector of data are stored in two bytes (i.e., 16 bits).

Referring back to FIG. 6A, when partition unit 215 receives a read command for a sector of data 552 that is not stored in the L2 cache 350 (i.e., a cache miss), the partition unit 215 transmits a read request for the sector of data 552 to DRAM 220, receiving the sector of data 552 and storing a copy of the data in the L2 cache 350. Partition unit 215 then decodes the address corresponding to that sector of data 552 to generate an address for a corresponding sector of ECC checkbits 554. Then, partition unit 215 determines whether the sector of ECC checkbits 554 is stored in the L2 cache 350. If the L2 cache 350 indicates a cache hit, then the ECC checkbits 554 corresponding to the sector of data 552 are read from the L2 cache 350 and used to check the reliability of the sector of data 552. However, if the L2 cache 350 indicates a cache miss, then the partition unit 215 transmits a read request for the sector of ECC checkbits 554 to the DRAM 220, receiving the sector of ECC checkbits 554 and storing a copy of the ECC checkbits 554 in the L2 cache 350. Then, arbiter 408 can read the data 552 and corresponding ECC checkbits 556 from the L2 cache 350 to check the reliability of the sector of data 552, updating the data in the L2 cache 350 if the ECC checkbits indicate a single bit error or asserting an error signal if a double bit error is detected.

It will be appreciated that some embodiments of the invention may be implemented using techniques for storing ECC checkbits 554 as illustrated in FIG. 5B (i.e., the conventional technique). In such embodiments, instead of reading the ECC checkbits 556 into the FIFO 410, the partition unit 215 may simply store the sector of ECC checkbits 554 in the L2 cache 350 as described in conjunction with FIGS. 6A, 6B, and 6C, and the arbiter 408 reads the data 552 and corresponding ECC checkbits 556 from the L2 cache 350.

Figure 7A:
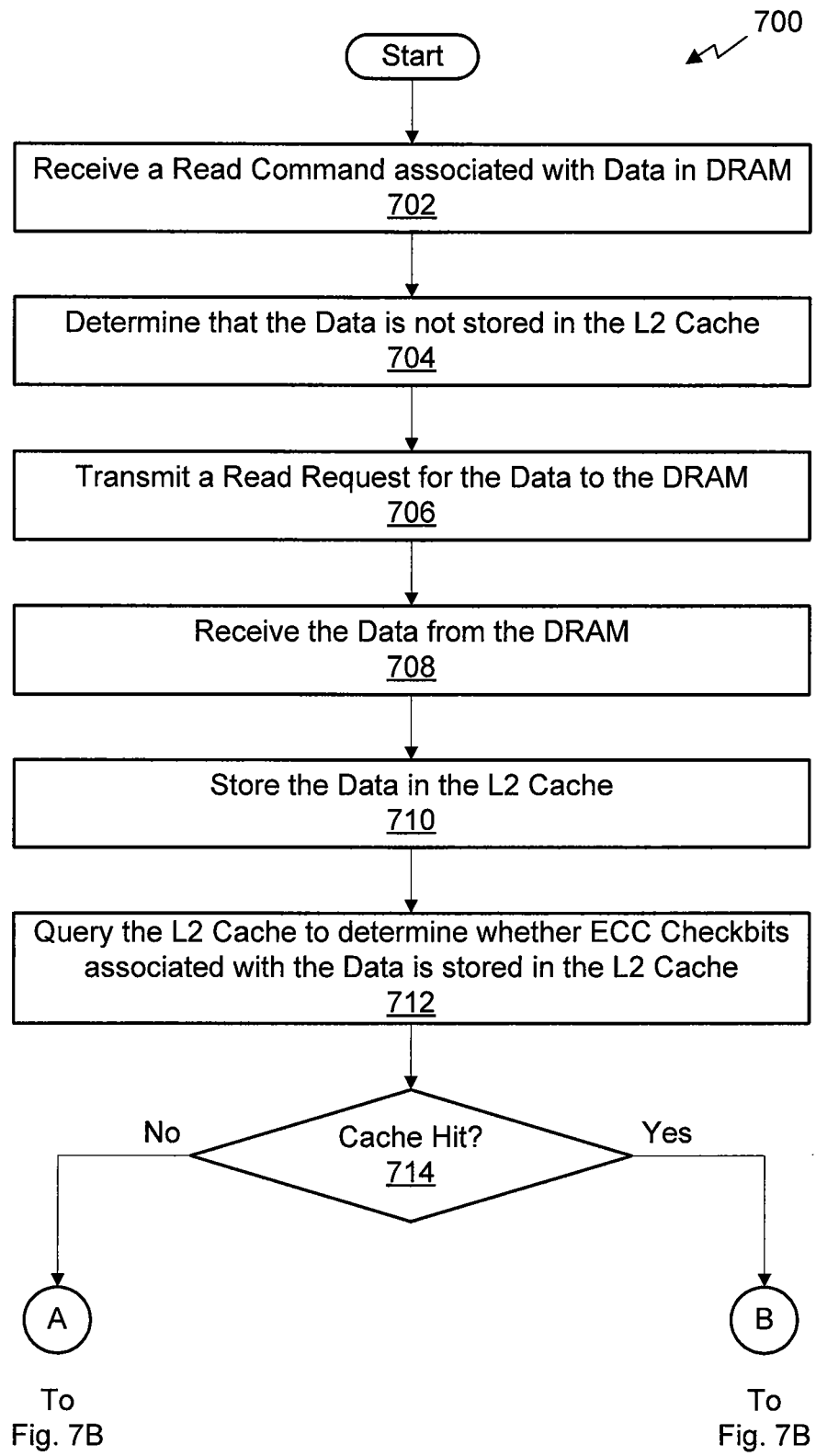
FIGS. 7A and 7B are a flow diagram of methods steps for storing ECC checkbits in an L2 cache, according to one embodiment of the present invention.
Figure 7B:
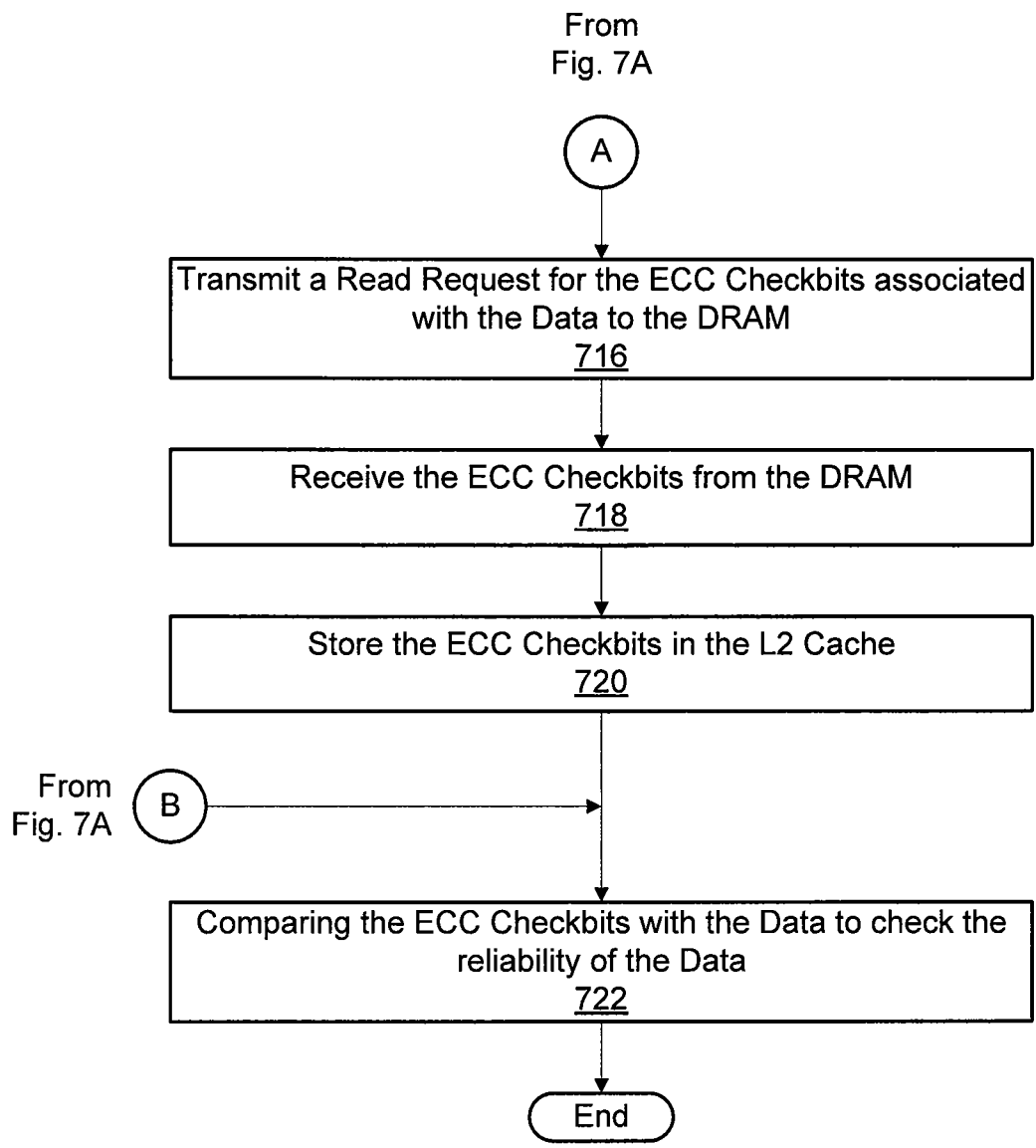

FIGS. 7A and 7B are flow diagram of methods steps for storing ECC checkbits 554 in an L2 cache 350, according to one embodiment of the present invention. Although the method steps are described in conjunction with the systems of FIGS. 1-6C, persons of ordinary skill in the art will understand that any system configured to perform the method steps, in any order, is within the scope of the present invention.

The method 700 begins at step 702, where partition unit 215 receives a read command 400 associated with a sector of data 552 stored in a memory unit (i.e., DRAM 220) coupled to the L2 cache 350. At step 704, partition unit 215 determines that a copy of the data 552 associated with the read command 400 is not stored in the L2 cache 350. In one embodiment, the partition unit 215 queries the L2 cache 350 to determine whether a cache hit occurs in response to the read command 400. In a set associative cache, the L2 cache 350 compares an address included in the read command 400 with a tag list in the L2 cache 350 to determine if a copy of the data 552 associated with the address is temporarily stored in the L2 cache 350. If the tag associated with the address is included in the tag list, then the L2 cache 350 indicates a cache hit. However, if the tag associated with the address is not included in the tag list, then the L2 cache 350 indicates a cache miss and the data 552 is fetched from the DRAM 220. At step 706, the partition unit 215 transmits a read request for the sector of data 552 to the DRAM 220. The read request includes the address associated with the sector of data 552. At step 708, the partition unit 215 receives the data 552 from the DRAM 220 and, at step 710, stores a copy of the data 552 in the L2 cache 350.

At step 712, partition unit 215 queries the L2 cache 350 to determine whether ECC checkbits 556 corresponding to the data 552 are stored in the L2 cache 350. At step 714, partition unit 215 determines whether the address for a sector of ECC checkbits 554 that includes the ECC checkbits 556 corresponding to the data 552 causes a cache hit as indicated by the L2 cache 350. If the L2 cache 350 indicates a cache hit, then method 700 proceeds to step 722 where partition unit 215 compares the ECC checkbits 556 with the data 552 to check the reliability of the data 552. In one embodiment, if the comparison indicates that the data 552 has a single bit error, then the partition unit 215 (i.e., arbiter 408) is configured to correct the error using the ECC checkbits 556. Returning now to step 714, if the L2 cache 350 indicates a cache miss, then method 700 proceeds to step 716 where partition unit 215 transmits a read request to the DRAM 220 to fetch the plurality of ECC checkbits 554 from the DRAM 220. At step 718, partition unit 215 receives the plurality of ECC checkbits 554 from the DRAM 220 and, at step 720, stores a copy of the plurality of ECC checkbits 554 in the L2 cache 350. Once both the copy of the data 552 and the copy of the ECC checkbits 554 are temporarily cached in the L2 cache 350, partition unit 215 performs step 722, as set forth above.

In sum, a partition unit is configured to store both data and any associated error-correcting codes in a cache. A single cache line of error-correcting codes includes codes for multiple cache lines of data. The invention reduces memory requests to the memory unit because when a particular cache line of data is read from the memory unit, the cache line that includes the associated error-correcting codes may already be cached locally.

One advantage of the disclosed system is that error-correcting codes are cached locally and may be used for multiple sectors of data associated with the same sector of error-correcting codes stored in memory. The described embodiments reduce the number of read requests transmitted to the memory unit, thereby enabling more of the available memory bandwidth to be used for data rather than error-correcting codes.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for checking the reliability of data in a cache, the method comprising:
   receiving a read command associated with data stored at a physical address in a memory unit coupled to the cache;
   determining that the data associated with the read command is not stored in the cache, then obtaining the data from the memory unit and storing the data in the cache;
   querying the cache to determine whether a plurality of ECC (error-correcting code) checkbits associated with the data are stored in the cache; and
   if the cache indicates a cache hit, then comparing the plurality of ECC checkbits to the data to check the reliability of the data, or
   if the cache indicates a cache miss, then:
      obtaining the plurality of ECC checkbits from the memory unit, and
      comparing the plurality of ECC checkbits to the data to check the reliability of the data.

2. The method of claim 1, wherein the plurality of ECC checkbits comprises a Hamming code.

3. The method of claim 2, wherein the plurality of ECC checkbits implements a SEC-DED error-correcting scheme.

4. The method of claim 1, wherein the plurality of ECC checkbits comprises 16 bits for every 256 bits of data.

5. The method of claim 1, wherein a first virtual memory page includes the data and a second virtual memory page includes the plurality of ECC checkbits.

6. The method of claim 1, wherein a first virtual memory page includes both the data as well as the plurality of ECC checkbits.

7. The method of claim 1, wherein the cache is divided into two or more cache slices.

8. The method of claim 7, wherein data associated with a first process is stored in a first cache slice and data associated with a second process is stored in a second cache slice.

9. A system for checking the reliability of data in a cache, the system comprising:
   a memory unit; and
   a partition unit including the cache and coupled to the memory unit, the partition unit configured to:
      receive a read command associated with data stored at a physical address in a memory unit coupled to the cache,
      determining that the data associated with the read command is not stored in the cache, obtain the data from the memory unit and store the data in the cache,
      query the cache to determine whether a plurality of ECC (error-correcting code) checkbits associated with the data are stored in the cache, and
      if the cache indicates a cache hit, then comparing the plurality of ECC checkbits to the data to check the reliability of the data, or
      if the cache indicates a cache miss, then:

obtain the plurality of ECC checkbits from the memory unit, and compare the plurality of ECC checkbits to the data to check the reliability of the data.

10. The system of claim 9, wherein the plurality of ECC checkbits comprises a Hamming code.

11. The system of claim 10, wherein the plurality of ECC checkbits implements a SEC-DED error-correcting scheme.

12. The system of claim 9, wherein the plurality of ECC checkbits comprises 16 bits for each 256 bits of data.

13. The system of claim 9, further comprising a memory management unit (MMU) configured to translate virtual addresses into physical addresses in the memory unit.

14. The system of claim 13, wherein a first virtual memory page includes the data and a second virtual memory page includes the plurality of ECC checkbits.

15. The system of claim 13, wherein a first virtual memory page includes the data as well as the plurality of ECC checkbits.

16. The system of claim 9, wherein the cache is divided into two or more cache slices, and wherein data associated with a first process is stored in a first cache slice and data associated with a second process is stored in a second cache slice.

17. A computing device comprising:

a partition unit including a cache, the partition unit configured to:

receive a read command associated with data stored at a physical address in a memory unit coupled to the cache, determining that the data associated with the read command is not stored in the cache, obtain the data from the memory unit and store the data in the cache, query the cache to determine whether a plurality of ECC (error-correcting code) checkbits associated with the data are stored in the cache, and if the cache indicates a cache hit, then comparing the plurality of ECC checkbits to the data to check the reliability of the data, or if the cache indicates a cache miss, then:

obtain the plurality of ECC checkbits from the memory unit, and compare the plurality of ECC checkbits to the data to check the reliability of the data.

18. The computing device of claim 17, wherein the plurality of ECC checkbits comprises 16 bits for each 256 bits of data.

19. The computing device of claim 17, wherein the cache comprises a level two (L2) cache.

20. The computing device of claim 17, wherein the computing device comprises a graphics processing unit (GPU).

* * * * *